United States Patent [19]
Huang

[11] Patent Number: 5,535,900
[45] Date of Patent: Jul. 16, 1996

[54] BOTTLE CAP WITH AN AIR REMOVING DEVICE

[75] Inventor: Kwong-Sun Huang, Tainan Hsien, Taiwan

[73] Assignee: P. Yeh Engineering Plastic Corp., Tainan Hsien, Taiwan

[21] Appl. No.: 514,167

[22] Filed: Aug. 11, 1995

[51] Int. Cl.$^6$ ............................................. B65D 51/16
[52] U.S. Cl. .................... 215/228; 215/262; 215/270; 215/311; 220/212; 220/231; 220/240; 99/472; 137/522; 137/526; 137/854; 141/65; 417/437
[58] Field of Search ........................ 215/228, 262, 215/270, 311; 220/203.29, 212, 231, 240, 261, 373; 99/472; 137/522, 526, 854; 141/65, 66; 417/437

[56] References Cited

U.S. PATENT DOCUMENTS

| | | | |
|---|---|---|---|
| 4,051,971 | 10/1977 | Saleri et al. | 215/260 |
| 4,524,877 | 6/1985 | Saxby et al. | 215/228 |
| 5,031,785 | 7/1991 | Lemme | 215/228 |
| 5,390,809 | 2/1995 | Lin | 220/212 |
| 5,405,038 | 4/1995 | Chuang | 220/231 |
| 5,449,079 | 9/1995 | Yang | 215/228 |
| 5,465,857 | 11/1995 | Yang | 215/228 |

*Primary Examiner*—Stephen K. Cronin
*Attorney, Agent, or Firm*—Pro-Techtor International

[57] ABSTRACT

A bottle cap with an air removing device consists of a cap unit and an air stopper combined together. The cap unit includes an upper cap portion, a lower cylindrical portion and a valve formed in an interior of both the upper cap portion and the lower cylindrical portion and having a capsule-shaped cavity for a stopper of the air stopper to fit and move up and down therein to stop an air hole in a bottom of the valve so that the air in a bottle fitted with this cap may be pumped out by an extra air pump fitted in an open cavity of the upper cap portion. After the air in the bottle is pumped out, then the air stopper is pushed down by the air pump again, keeping the cap firmly fixed on the mouth of the bottle in an almost vacuum condition, wherein the food therein may not deteriorate for a long time.

1 Claim, 6 Drawing Sheets

BOTTLE CAP WITH AN AIR REMOVING DEVICE

BACKGROUND OF THE INVENTION

This invention concerns a bottle cap with an air removing device, particularly able to keep the food contained in a bottle fresh for a long time, and to be taken off easily in case of necessity.

A conventional vacuum container and a conventional liquor bottle shown in FIGS. 7 and 8 have many components to take much time in assembling. It has a flexible cap body covering an air hole so that the container or the bottle may be pumped out of the air existing therein, by means of a thin valve member to move up and down to open or close an air passageway through an air stopper. However, frequent movement of the thin valve member can disfigure itself and the air stopper, reducing their service life. Besides, the cap is not easily taken off because of its flexibility and the atmosphere difference between the outside and the inside of the container or the bottle.

SUMMARY OF THE INVENTION

This invention has been devised to offer a bottle cap with an air removing device, to pump out the air in a bottle by means of an extra air pump placed on the cap to suck out the air and to seal closed the cap, which may be opened by raising up a press button of an air stopper to let outer air flow through the cap into the bottle after the air in the bottle is removed to become almost vacuum.

BRIEF DESCRIPTION OF DRAWINGS

The invention will be better understood by reference to the accompanying drawings, wherein.

DETAILED DESCRIPTION OF THE INVENTION

Figure 1:
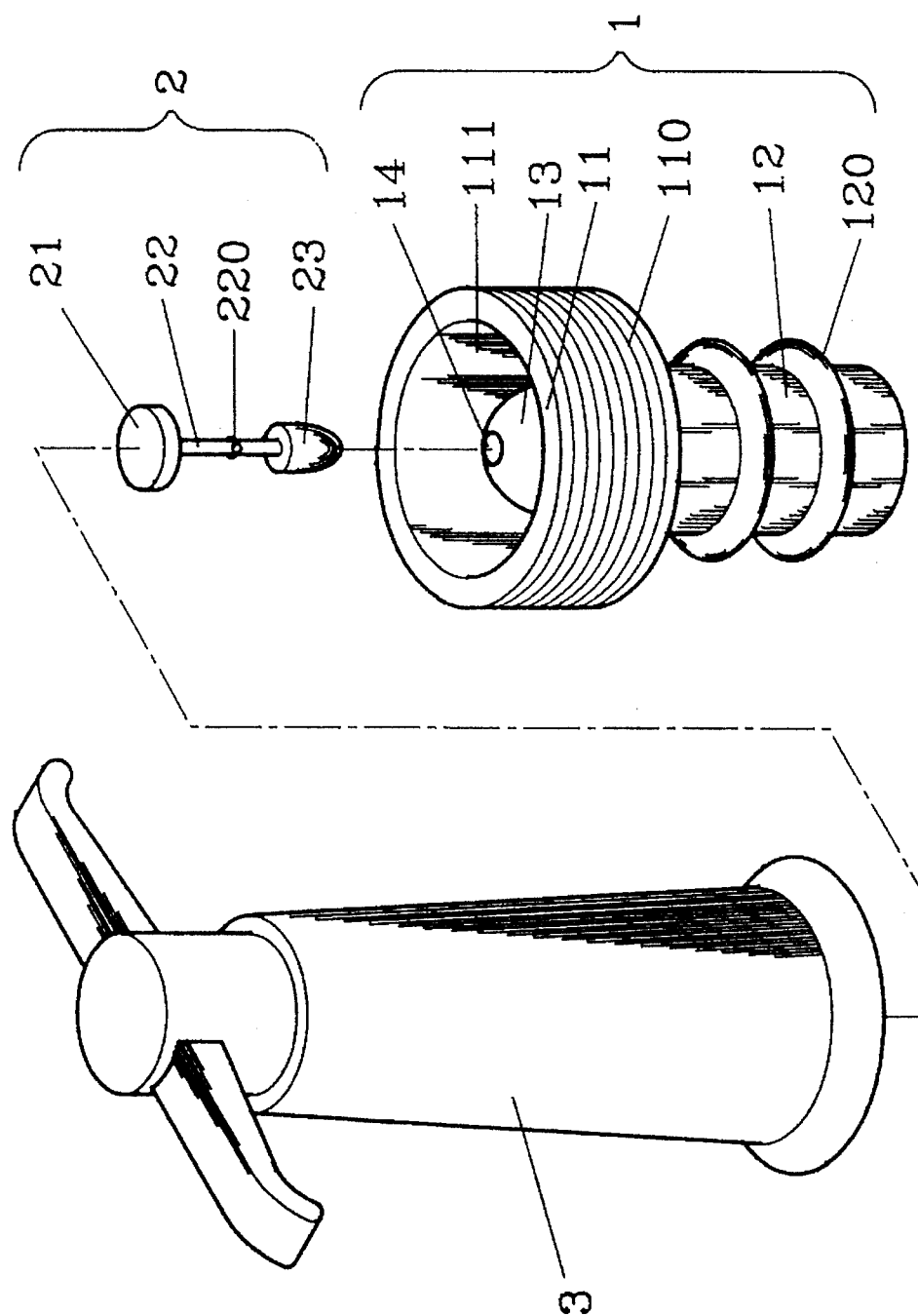
FIG. 1 is an exploded perspective view of a first embodiment of a bottle cap with an air removing device in the present invention.
Figure 2:
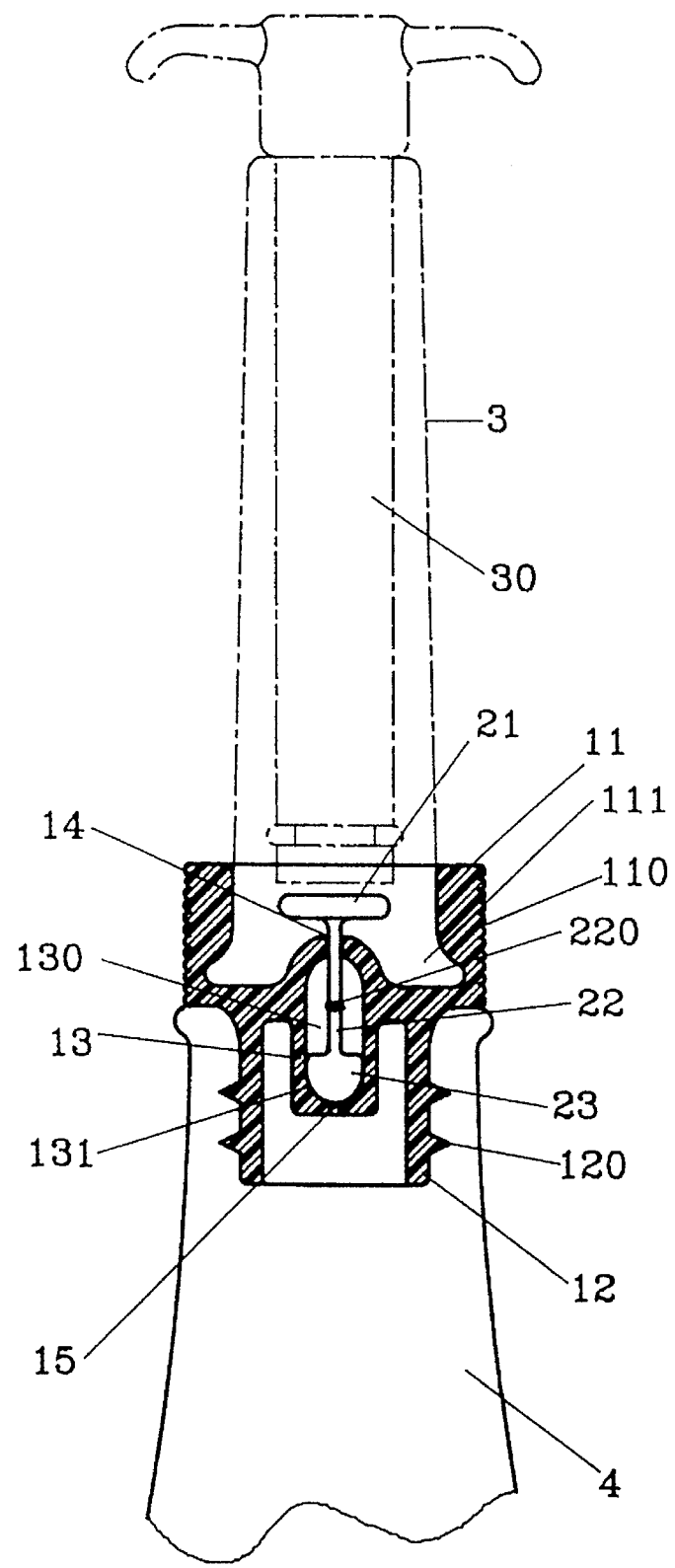
FIG. 2 is a side cross-sectional view of the first embodiment of the bottle cap with an air removing device in the present invention.
Figure 4:
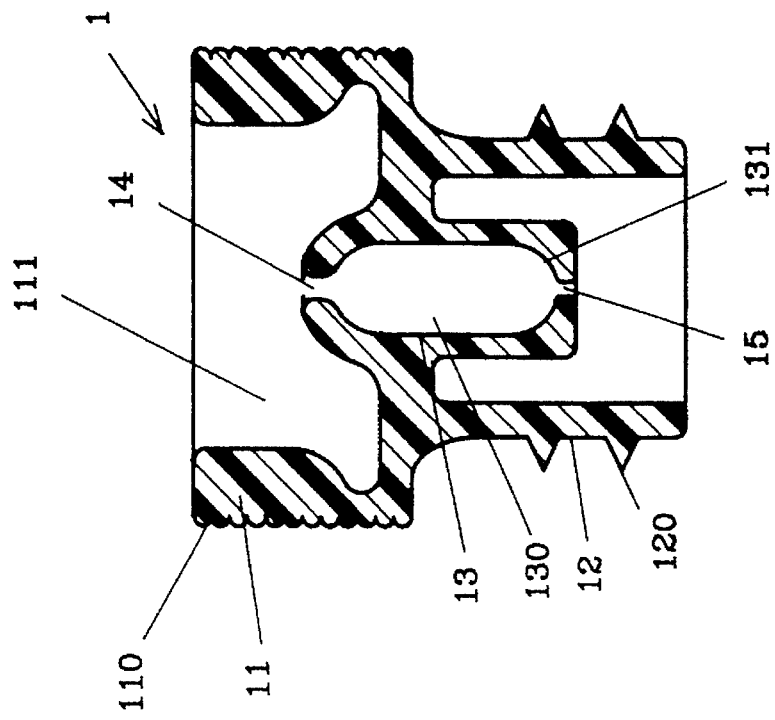
FIG. 4 is a side cross-sectional view of the first embodiment of the bottle cap with an air removing device in the present invention.
Figure 3:
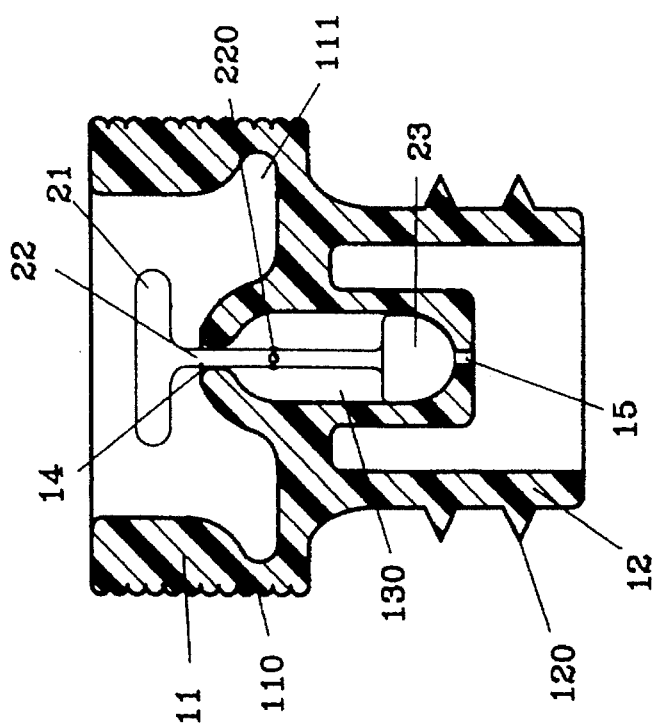
FIG. 3 is a side cross-sectional view of the first embodiment of the bottle cap with an air removing device in the present invention.

A first embodiment of a bottle cap with an air removing device in the present invention, as shown in FIGS. 1–4, comprises a cap unit 1 and an air stopper unit 2 combined together.

The cap unit 1 is made of a soft resilient material, consisting of an upper cap portion 11 with a hollow interior, a cylindrical portion 12 connected under the upper cap portion 11, and a valve 13 arranged in the interior of the upper cap portion 11 and the cylindrical portion 12. The cylindrical portion 12 includes a plurality of annular saw teeth 120 spaced apart for fitting tightly in a mouth of a bottle or container. The upper cap portion 11 has a plurality of annular curved continuous ridges 110 on an outer vertical surface, an inner center cavity 111 for receiving a bottom of an air pump 3. The valve 13 includes a capsule-shaped vertical cavity 130, a center hole 14 bored in an upper wall defining the cavity 130 and communicating with the cavity 130, an air hole 15 bored in a bottom defining the cavity 130.

The air stopper unit 2 includes a press button 21 of a disc shape at top, a connect rod 22 extending down from the press button 21 and having a plurality of projections 220 around an intermediate edge, and a stopper 23 having a capsule-shaped bottom. Pushing down the press button 21 can make the stopper 23 together with the connect rod 22 forcefully pushed through the center hole 14 of the valve 13 into the cavity 130. The stopper 23 can move up and down in the cavity 130 so as to rest on the bottom surface thereof to block the air hole 15, with the connect rod 22 moving along the center hole 14. And movement of the press button 21 is effected by downward movement of a cylinder 30 of an air pump 3. On the other hand, if the cylinder 30 of the air pump 3 is pulled upward, the air stopper unit 2 is raised up, surwith the stopper 23 separated from the semiround bottom surface 131, and with the projections 220 of the connect rod 22 urging the center hole 14 open a little so that the air in the bottle 4 may flow out of the air hole 15, the cavity 130 and through the center hole 14 by being sucked upward by the cylinder 3.

Figure 6:
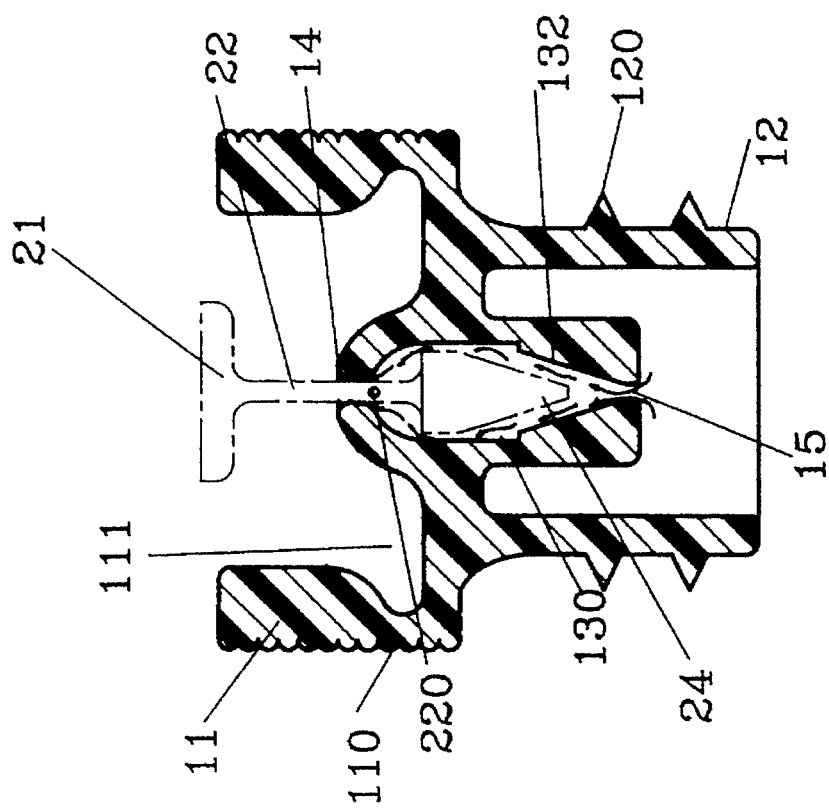
FIG. 6 is a side cross-sectional view of the second embodiment of bottle cap with an air removing device in the present invention, showing an air stopper unit in a lifted position.
Figure 5:
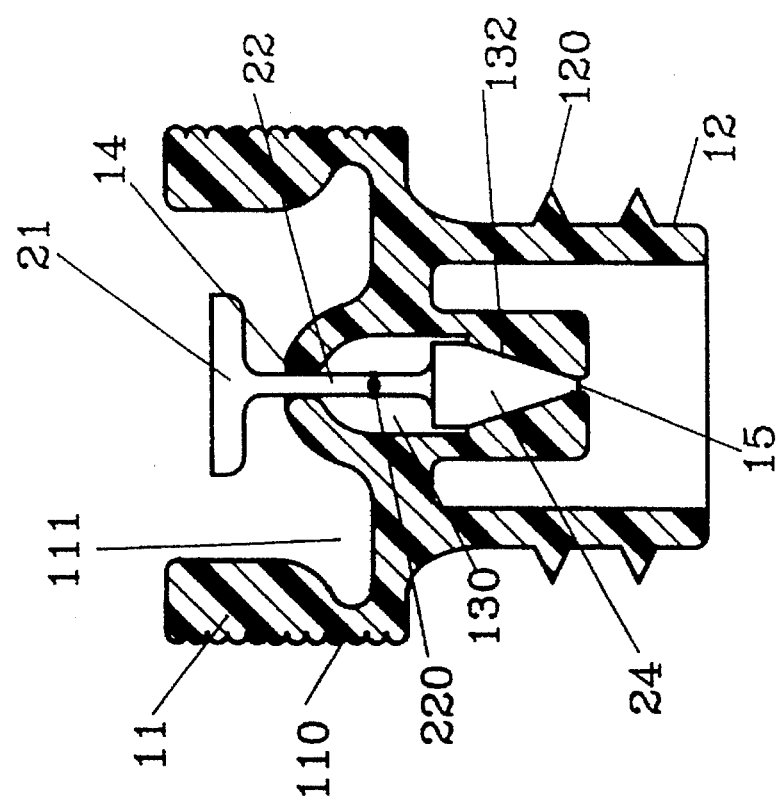
FIG. 5 is a side cross-sectional view of a second embodiment of a bottle cap with an air removing device in the present invention.
Figure 7:
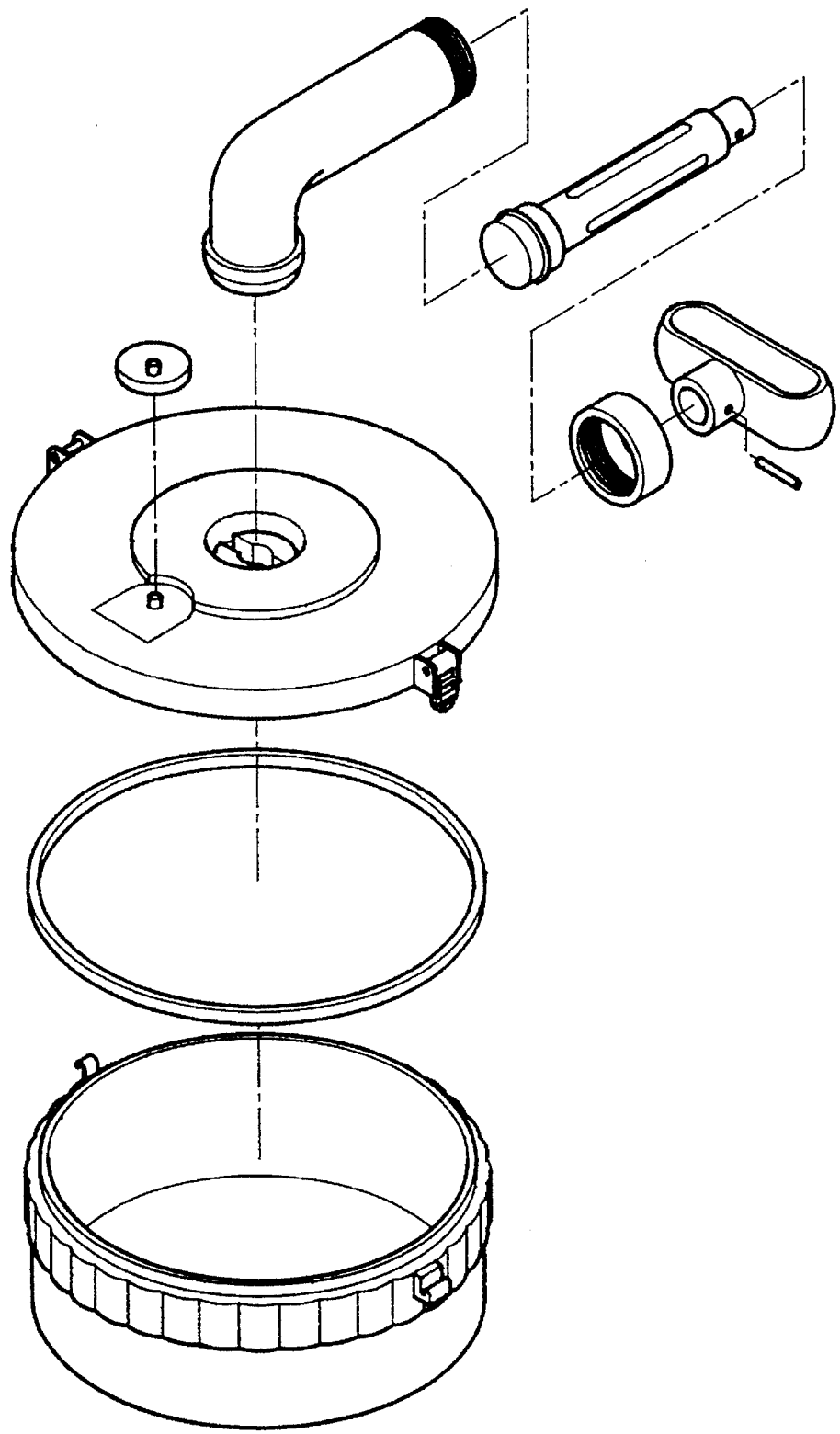
FIG. 7 an exploded perspective view of a conventional container with a vacuum device.
Figure 8:
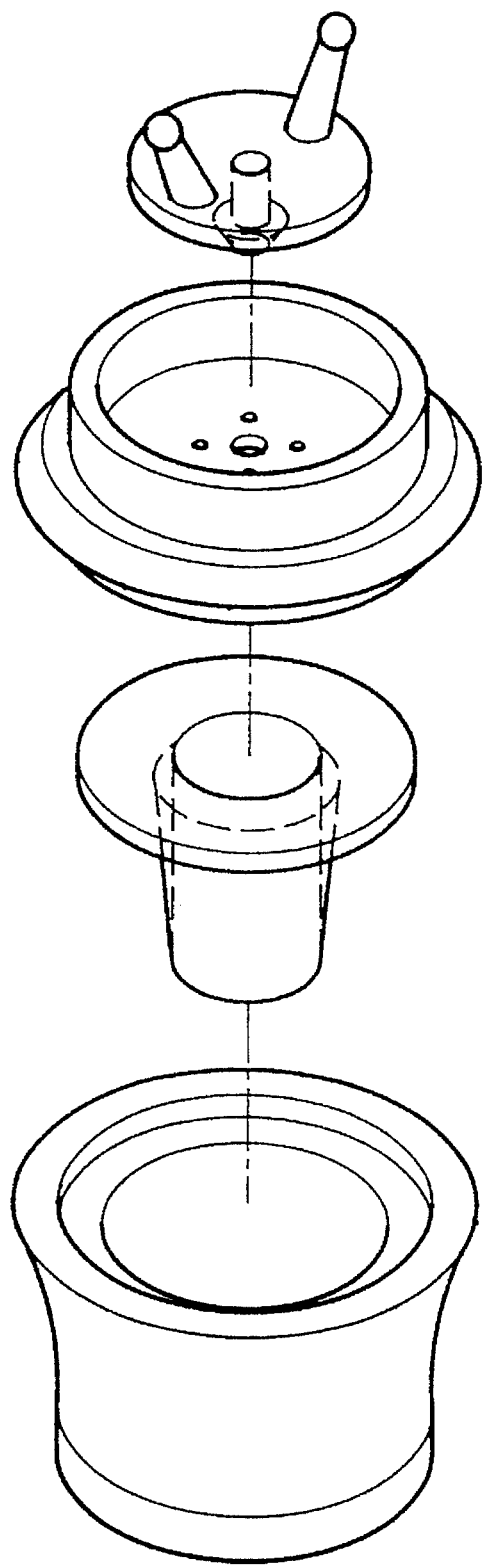
FIG. 8 is an exploded perspective view of a conventional liquor container with a vacuum device.

A second embodiment of a bottle cap with an air removing device in the present invention is shown in FIGS. 5 and 6, having the same structure as the first embodiment except the valve 13 having a cone-shaped bottom surface 132 instead of the capsule-shaped bottom surface 131 of the first embodiment and a cone-shaped stopper 24 instead of the capsule-shaped stopper 23 of the first embodiment. The cone-shaped cavity 130 has conical bottom surface 132 to respond to the stopper 24 so that the stopper 24 may move down to block the air hole 15 or move up to separate from the air hole 15 to let the air in a bottle flow out thereof in the same way as the first embodiment.

After the air in a bottle fixed with this cap with an air removing device is almost removed or pumped out by means of the extra air pump 3, the air stopper 2 is pushed down by lowering movement of the cylinder 30 of the air pump 3, with the stopper 23 resting on the bottom of the capsule-shaped cavity 130 and blocking the air hole 15 so that the bottle with air removed may be kept in that condition, wherein food contained in the bottle can be stored for a long time without deteriorating.

In case that the food contained in the bottle is needed to be taken out, the press button 21 of the air stopper unit 2 is to be pulled up manually, with the stopper 23 moved up to separate from the bottom of the cavity 130 of the valve 13 and permitting outer air flow though the center hole 14, the cavity 130 and the air hole 15 into the bottle. Then the cap unit can be easily taken off the mouth of the bottle 4.

What is claimed is:

1. A bottle cap with an air removing device, comprising:
   a cap unit made of a soft resilient material, having (1) an upper cap portion with a hollow interior, (2) a cylindrical portion extending from under the upper cap portion, and (3) an integral valve formed in an interior of the upper cap portion and the cylindrical portion, said upper cap portion having an outer vertical surface provided with a plurality of curved continuous ridges for manual gripping and an inner cylindrical cavity with a larger diameter lower section for firmly receiving a lower end of an air pump, said cylindrical portion having a plurality of annular spaced protruding saw teeth on an outer surface, said valve having a hollow interior with a curved upper wall, a cylindrical side wall and a curved lower wall, said upper wall provided with a center hole for a connect rod of an air stopper unit to fit and move up and down therein, said lower wall together with the side wall and upper wall forming an inner vertical cavity having the shape of a capsule for an air stopper unit to fit and move therein, said lower wall having an air hole in its bottom for the air in a bottle fitted with said cap to flow through;

an air stopper unit formed to have (1) an upper press button, (2) a connect rod extending down from under said press button and having a plurality of small projections around an intermediate edge and (3) a semi-capsule-shaped stopper connected at a bottom end of said connect rod; and said semi-capsule-shaped stopper being pushed through said center hole of said valve of said cap unit and surrounded by said capsule-shaped cavity of said valve and blocking said air hole of said valve when said stopper is pushed to rest the surface of said curved lower of said capsule-shaped cavity, whereby said air pump, having its lower end pushed in said inner cylindrical cavity of said upper cap portion of said cap unit, being operated to draw out the air and produce a vacuum in a bottle fitted with said cap through said center hole, said capsule-shaped cavity and said air hole in the bottom of said cavity of said valve, by sucking said air stopper unit upward with said air pump, said air pump being operated finally to push down the air stopper unit to let said semi-capsule-shaped stopper move down to block said air hole of said valve after the vacuum is produced so that said cap is sealed by firmly closing the mouth of said bottle, preventing the food contained in the bottle from deteriorating for a long period of time, said press button of said air stopper unit able to be lifted up manually to open said air hole of said valve for outer air to flow through said center hole, said inner cavity of said valve and through said air hole into said bottle so that said cap unit may be pulled off the mouth of said bottle for taking out the content thereof.

* * * * *